United States Patent
Marks et al.

(10) Patent No.: US 7,938,315 B2
(45) Date of Patent: May 10, 2011

(54) INTEGRATED DATABASE FOR TRACKING SHIPPING INFORMATION

(75) Inventors: Peter Marks, San Anselmo, CA (US); Roger Gibby, Concord, CA (US)

(73) Assignee: Lynch Marks LLC, Albany, CA (US)

(*) Notice: Subject to any disclaimer, the term of this patent is extended or adjusted under 35 U.S.C. 154(b) by 607 days.

(21) Appl. No.: 12/009,126

(22) Filed: Jan. 15, 2008

(65) Prior Publication Data

US 2008/0283586 A1    Nov. 20, 2008

Related U.S. Application Data

(60) Provisional application No. 60/928,516, filed on May 16, 2007.

(51) Int. Cl.
*G06F 17/00* (2006.01)

(52) U.S. Cl. ............. 235/375; 235/385; 705/1; 705/9; 705/11

(58) Field of Classification Search ........... 235/375, 235/385; 705/1, 9, 11
See application file for complete search history.

(56) References Cited

U.S. PATENT DOCUMENTS

| | | |
|---|---|---|
| 739,201 A | 9/1903 | Morton |
| 4,319,328 A | 3/1982 | Eggert |
| 4,832,204 A | 5/1989 | Handy et al. |
| 5,477,462 A | 12/1995 | McClung |
| 5,717,596 A | 2/1998 | Bernard et al. |
| 5,787,400 A | 7/1998 | Weber |
| 6,119,051 A | 9/2000 | Anderson, Jr. et al. |
| 6,298,337 B1 | 10/2001 | Kubatzki |
| 6,427,032 B1 | 7/2002 | Irons |
| 7,082,417 B1 | 7/2006 | Marry et al. |
| 7,149,726 B1 | 12/2006 | Lingle et al. |
| 7,209,897 B2 | 4/2007 | Ghiloni |
| 2002/0023057 A1 | 2/2002 | Goodwin et al. |
| 2002/0032573 A1 | 3/2002 | Williams et al. |
| 2003/0083890 A1* | 5/2003 | Duncan et al. ............ 705/1 |
| 2003/0115612 A1 | 6/2003 | Mao |
| 2004/0188522 A1 | 9/2004 | Ashaari |
| 2004/0230543 A1 | 11/2004 | Baker |
| 2004/0243501 A1 | 12/2004 | Duffey |
| 2004/0243522 A1 | 12/2004 | Foth |

(Continued)

FOREIGN PATENT DOCUMENTS

GB    2428315 A    1/2007

OTHER PUBLICATIONS

Online Publication, www.eshipper.com/aboutus.aspx, Publication Date: Nov. 18, 2006.

(Continued)

*Primary Examiner* — Allyson N Trail
(74) *Attorney, Agent, or Firm* — Carr & Ferrell LLP (57) ABSTRACT

Systems and methods of the present invention for using an integrated database for shipping information are provided. Information gathered or entered during shipping label generation may be stored in a database. The label information may concern shipping labels associated with multiple shipping vendors. Information concerning shipping invoices may be received from the multiple shipping vendors are received, and a report may be generated based on the stored label information and the invoice information. The invoice information may also be stored in the database. Further, the invoice information may include electronic data interchange files received through vendor-specific interfaces.

18 Claims, 7 Drawing Sheets

U.S. PATENT DOCUMENTS

| | | | |
|---|---|---|---|
| 2004/0263901 A1 | 12/2004 | Critelli et al. | |
| 2005/0171791 A1 | 8/2005 | Chimenti et al. | |
| 2005/0171919 A1 | 8/2005 | Baker et al. | |
| 2005/0237203 A1 | 10/2005 | Burman et al. | |
| 2005/0237204 A1 | 10/2005 | Burman et al. | |
| 2005/0278263 A1 | 12/2005 | Hollander | |
| 2006/0020505 A1 | 1/2006 | Whitehouse | |
| 2006/0080266 A1 | 4/2006 | Kiani | |
| 2006/0089869 A1* | 4/2006 | Mundy | 705/11 |
| 2006/0089897 A1* | 4/2006 | Maas et al. | 705/37 |
| 2006/0173797 A1 | 8/2006 | Sheehan | |
| 2006/0173798 A1 | 8/2006 | Charroppin | |
| 2006/0229895 A1 | 10/2006 | Kodger, Jr. | |
| 2006/0282271 A1 | 12/2006 | Ananda et al. | |
| 2006/0282277 A1 | 12/2006 | Ng | |
| 2007/0000990 A1 | 1/2007 | Baldassari et al. | |
| 2007/0022059 A1 | 1/2007 | Heiden | |
| 2007/0043651 A1 | 2/2007 | Xiao et al. | |
| 2007/0073551 A1 | 3/2007 | Williams et al. | |
| 2007/0124084 A1 | 5/2007 | Torre-Bueno | |
| 2007/0260561 A1 | 11/2007 | Martin | |
| 2008/0126218 A1 | 5/2008 | Alvarado et al. | |
| 2008/0210749 A1 | 9/2008 | Skaaksrud | |
| 2008/0255863 A1* | 10/2008 | Mack et al. | 705/1 |
| 2008/0288368 A1 | 11/2008 | Marks et al. | |
| 2008/0288422 A1 | 11/2008 | Marks et al. | |
| 2008/0288463 A1 | 11/2008 | Marks et al. | |
| 2009/0057403 A1 | 3/2009 | Marks et al. | |
| 2009/0076918 A1* | 3/2009 | Blanchet | 705/14 |
| 2009/0094082 A1 | 4/2009 | Willoughby | |
| 2010/0057596 A1* | 3/2010 | Sundel | 705/31 |
| 2010/0223173 A1* | 9/2010 | Kadaba | 705/34 |

OTHER PUBLICATIONS

Online article, www.pr.com, "Shipping Sidekick . . . ", Publication Date: Aug. 31, 2007.

PS Ship Label Server, Published by Lynch Marks LLC as noted by web.archive.org on Feb. 13, 2006 of website http://web.archive.org/web/20060213043422/psship.com/pdf/psship_ups.pdf.

* cited by examiner

FIG. 4 ps◇SHIP

Invoice

Invoice No. [          ]
Vendor ID [<All Vendors>▾]
Account No. [<All Accounts>▾]
Bill Date [01/04/2004] 🗓 to [04/04/2007] 🗓
Invoice Status [Not Fully Exported ▾]

[Clear Filter] [Apply Filter]

{ Receipt Generator  Export/Remit  Invoices }

Results

<u>«previous 1 of 2 next»</u>

| Vendor | Invoice No. | Bill Date ↑ | Type | Net Total (#) | Pay Account | Reviewed | Exp/Rem |
|---|---|---|---|---|---|---|---|
| FedEx | 123321016 | 05/20/05 | Balance Due Billing | $ 1845.43 ( 141 ) | 112233584 | 1 % | ☐ / ☐ |
| FedEx | 123321607 | 05/18/05 | Balance Due Billing | $ 2973.22 ( 211 ) | 112233646 | 14 % | ☐ / ☐ |
| FedEx | 123321717 | 05/14/05 | Balance Due Billing | $ 570.30 ( 67 ) | 112233664 | 37 % | ☐ / ☐ |
| FedEx | 123321724 | 05/11/05 | Balance Due Billing | $ 582.00 ( 56 ) | 112233271 | 37 % | ☐ / ☐ |
| unknown | 123321674 | 05/10/05 | Balance Due Billing | $ 11.00 ( 1 ) | 112233584 | 0 % | ☐ / ☐ |
| FedEx | 123321637 | 05/09/05 | Balance Due Billing | $ 3540.05 ( 285 ) | 112233646 | 0 % | ☐ / ☐ |
| FedEx | 123321419 | 05/08/05 | Balance Due Billing | $ 1536.53 ( 124 ) | 112233664 | 6 % | ☐ / ☐ |
| FedEx | 123321543 | 05/05/05 | Balance Due Billing | $ 404.31 ( 54 ) | 112233664 | 100 % | ☐ / ☐ |

FIG. 5A ps SHIP

Invoices | Process Invoice

Invoice Details
Shipping Vendor: FedEx   Invoice No.: 123321016   Master Account: 1212122672   Payment Account: 112233584
Invoice Date: 05/20/05   Net Total: $1845.43   Terms: 15   Transactions: 141   Reviewed: 1%

Filter Options

Chargeback Validation
- ☐ Invalid Billing & Invalid Sender (140)
- ☐ Invalid Billing & Valid (Sender (0)
- ☐ Valid Billing & Invalid Sender (1)
- ☐ Valid Billing Data & Valid Sender (0)

Charge Summary
- ☐ Delivery Area Surcharge (1)
- ☐ Discount Amount (139)
- ☐ Freight Charge (141)
- ☐ Fuel Surcharge (141)
- ☐ Residential Delivery (23)

Additional Filter Options

Chargeback Filter
Billing Type [All billing types ▼]
Client ID [____] [Search] [Recent]
Matter ID [____] [Search]
Sender ID [____] [Search] [Recent]

[Clear Filter] [Apply Filter]

Result Filter
Has Notes ☐
Has Challenge ☐
Status [<Any State> ▼]
Recipient [____]
Operator ID [____] [Search]

Action: [Review ⊙] [Batch ○] [Excel ○] [Report ○]   Scope: [Filtered ⊙] [Selected ○] [Invoice ○]   [Apply Action]

Invoice Summary Results

| ☐ | Company | Name | Total | C/M/S | 9998/0002/N | Rev/Exp Y/N |
|---|---------|------|-------|-------|-------------|-------------|
| ☐ | Sample Company | Sample Recipient | 15.46 | 9998/0002/N | | Y/N |
| ☐ | Sample Company | Sample Recipient | 14.46 | N/N/N | | N/N |

FIG. 5B ps|SHIP

Transaction Review

| Invoices | Process Invoice |
|---|---|
| | 1 of 4 (25%) |

Progress 0

Transaction Detail

Package [PS|Ship] [Other]

Transaction ID 1946

Service FedEx Priority
Requested Delivery Service

Picked up Wed, Apr 27, 2005 at

Delivered Wed, Apr 27, 2005 01:44 PM

Signatory

Packaging Type

Net Weight 0.00

Original Weight 0.00

Method of Payment

Source of Air Waybill Unknown

Addresses

Sender
Sample Company
Sample Sender
Sample Address 1
BOSTON, MA, 02459 - US

Recipient
Sample Company
Sample Recipient
Sample Address 1
COLUMBIA MO, 652010000 - US

Tracking and Reference Details

Tracking Number 621480999111
Ref line 1   93050-001
Shipping Notes

Transaction Charges

| Discount Amount | -12.75 |
| Freight Charge | 25.50 |
| Fuel Surcharge | 0.51 |
| Residential Delivery | 1.40 |
| Total | $ 14.66 |

Billing

Billing Type [Client/Matter ▼]

client id [        ] [Search] [Recent]

matter id [        ] [Search]

sender id [        ] [Search] [Recent]

Challenge

Challenge? ☐

Reason [< Please Select > ▼]

Note: [        ]

☑ Mark As Reviewed

[Reset] [Reset & Return] [Process & Return] [Skip to Next >>] [Process & Next >>]

© 2003-2008 Lynch Marks LLC. All Rights Reserved. PS|Ship™ is a trademark of Lynch Marks LLC.
Other product and company names listed are trademarks or tradenames of their respective companies.

FIG. 5C

INTEGRATED DATABASE FOR TRACKING SHIPPING INFORMATION

CROSS-REFERENCE TO RELATED APPLICATIONS

The present application claims the priority benefit of U.S. provisional patent application No. 60/928,516, filed May 16, 2007 and entitled "Methods and Systems for Shipping Management." The present application is related to the nonprovisional applications titled "Real-Time Pricing Information for Shipping Vendors" and "Documenting Mail Work Flows," filed concurrently herewith. The disclosures of the aforementioned applications are incorporated herein by reference.

BACKGROUND OF THE INVENTION

1. Field of the Invention

The present invention relates to shipment management. More specifically, the present invention relates to using an integrated database for tracking shipping information.

2. Description of Related Art

There are presently a variety of ways to ship an item. The shipping vendors available to a user may include various well-known national and international vendors, such as FedEx®, United Parcel Service (UPS®), United States Postal Service (USPS®), and DHL®, as well as various local couriers. The availability of shipping services by shipping vendors may vary from location to location. For example, a local courier may only provide service within a particular city.

A shipment may also be sent using a variety of shipping options, including date and time restrictions, packaging options, recipient acknowledgement, and the like. For example, a package may need to be delivered in a padded envelope by a certain date and acknowledged by recipient signature. The availability of various shipping options may also differ from vendor to vendor. For example, a particular vendor may not offer overnight shipping, some vendors require overnight shipments to be ready for pick-up by a certain time, some vendors may have size and weight restrictions on overnight shipments, etc. In addition to size and weight restrictions, various other package specifications (e.g., shape, contents of package, value of contents) may also limit the availability of shipping options.

The variety of available shipment options and shipping vendors allows users to tailor their shipments in a variety of ways. Further, having multiple options for shipping vendors allows for price shopping and alternatives should a first shipping vendor be unable to ship a package or provide a certain shipping option. However, these multiple options for shipment can complicate the record-keeping and account reconciliation processes.

A shipment is typically associated with a variety of information from a variety of sources. Such information may include shipping label information, invoice information, etc., associated with multiple shipping vendors. Presently, accounting processes, such as record-keeping and account reconciliation, may often require a user to record information concerning each shipment by each shipping vendor, receive an invoice from each shipping vendor, review each invoice, compare each invoice entry against shipment records, and find matches. A user may further be asked to allocate shipping costs from multiple shipping vendors to the appropriate accounts, departments, clients, etc. In addition, a user may need to input shipping label and/or invoice information into a cost recovery or other accounting system. Managing information in such a manner may be inefficient, time-consuming, and prone to error.

There is, therefore, a need in the art for improved systems and methods for using an integrated database for shipping information.

SUMMARY OF THE INVENTION

Exemplary systems and methods of the present invention provide for using an integrated database for shipping information. In one embodiment, information gathered or entered during label generation is stored in a database. The database stores information concerning shipping labels associated with multiple shipping vendors and non-invoiced shipments (e.g., inter-office correspondence, USPS® mail). Once shipping invoices from the multiple shipping vendors or cost data concerning the non-invoiced shipments are received, a report may be generated based on the stored label information and/or invoice information. The invoice information may include electronic billing information (e.g., electronic data interchange (EDI) files) received through vendor-specific interfaces, data based on intra-office shipments, data based upon pre-paid shipments, such as USPS® mail, and/or data generated from the database. In some embodiments, the invoice information is also stored in the database.

Various other embodiments of the present invention include methods for using an integrated database for shipping information. Such methods may include storing label information from a variety of shipping vendors in a database, receiving invoice information from the shipping vendors, and generating a report based on the label information and invoice information, including information entered and stored in the database. In some embodiments, the invoice information may be stored in the same database, and the report may include information concerning reconciliation between label information and invoice information, cost allocation, cost recovery, billing, etc.

Some embodiments of the present invention include systems for using an integrated database for shipping information. Such systems may include a label generator for generating labels for multiple shipping vendors and internally generated shipments, a database for storing label information from the generated labels, and/or a report generator for generating reports based on label information and received invoice information. Other embodiments further include one or more communications interfaces specifically for communicating with each of the multiple shipping vendors.

Embodiments of the present invention also include computer media containing executable instructions for performing the described methods of using an integrated database for shipping information. The instructions may further provide for reconciling label information with invoice information and/or generating billing records based on the data stored in the database.

DETAILED DESCRIPTION

The present invention includes systems and methods for using an integrated database for shipping information. Shipping labels associated with a variety of shipping vendors and non-invoiced shipments (e.g., inter-office shipments, USPS®mail) are generated, and label information concerning the shipping labels are stored in a database. When invoices from the various shipping vendors and cost data concerning the non-invoiced shipments are received, the invoice and cost information, along with the label information stored in the database, may be used to generate a report. The report may include information concerning reconciliation of label information and invoice information, cost allocation, cost recovery, billing, etc.

Figure 1:
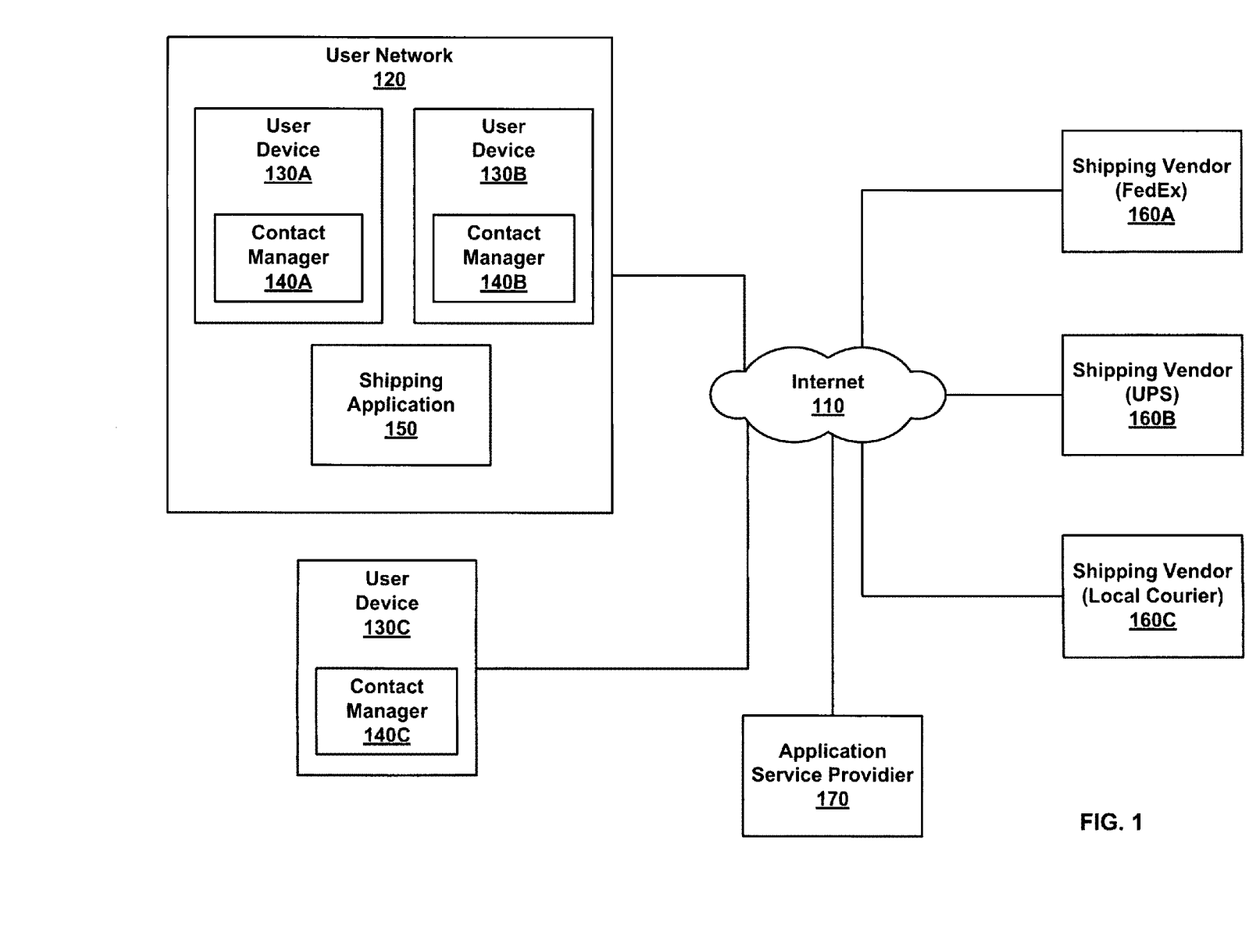
FIG. 1 illustrates an exemplary computer network in which an integrated database for shipping information may be used.

FIG. 1 illustrates an exemplary computer network in which an integrated database for shipping information may be used. Internet 110 allows for communication between user network 120 and various shipping vendors 160A-C. User network 120 is communicatively coupled to the Internet 110 and may include various user devices (e.g., user devices 130A and 130B), an accounting system 140, and a shipping application 150. The various shipping vendors 160A-C are also communicatively couple to the Internet and may receive and transmit information to user network 120. In some embodiments, the system 100 may include a user device 130C communicatively coupled over the Internet 110 to an application service provider (ASP) 170, which provides user device 130C with the same services as shipping application 150.

User network 120 may be a local, proprietary network (e.g., intranet), a part of a larger wide-area network, and/or a hosted network. For example, user network 120 may be a local area network (LAN) in an office. Alternatively, a user network 120 for a large organization may span multiple offices in multiple buildings in multiple locations.

User network 120 may include one or more user devices (e.g., user devices 130A and 130B). Such user devices may include various computing devices, workstations, etc. that allow users to communicate with various other components of system 100. For example, using user device 130A, a user may designate specifications for shipping labels, view label information, view invoice information, view reports, request reports based on various user specifications, etc. Each user device (e.g., user device 130A) may include a contacts manager (e.g., contacts manager 140A) configured to store information regarding various contacts, including addresses, telephone numbers, e-mail addresses, and the like. Contacts manager 140A may further correlate contact information with various shipping specifications (e.g., a particular address, such as a contact's office, may be associated with a particular courier service or particular delivery hours). Examples of contacts managers may include Microsoft Outlook®, Lotus Notes®, etc.

Accounting system 140 may be any system that an enterprise uses to manage various financial transactions. For example, accounting system 140 may be used to handle accounts receivable, accounts payable, invoice processing, cost allocation, cost recovery, billing, etc. To perform such transactions, accounting system 140 may require various types of input from one or more sources; for example, some information may be entered or selected by a user, from a shipping vendor's invoice, from internally generated intra-office transactions, from cost information entered manually (e.g., United States Postal Service rates), etc.

A shipping application 150 may also be installed in user network 120. Described in further detail with respect to FIG. 2, shipping application 150 allows for user devices in user network 120 to perform various communications and transactions with multiple shipping vendors. Shipping application 150 may be any collection of routines that perform various system-level functions and may be dynamically loaded and unloaded by hardware and device drivers as required. The modular software components described herein may also be incorporated as part of a larger software platform or integrated as part of an application specific component. In various embodiments, shipping application 150 may be installed on a server in user network 120, on one or more user devices in user network 120, or in any other appropriate fashion.

Shipping application 150 may further allow for communications and transactions that are specific to each shipping vendor. The shipping vendors 160A-C may include, for example, FedEx®, United Parcel Service (UPS®), and/or DHL®, as well as various local couriers, international and intra-office transactions.

Figure 2:
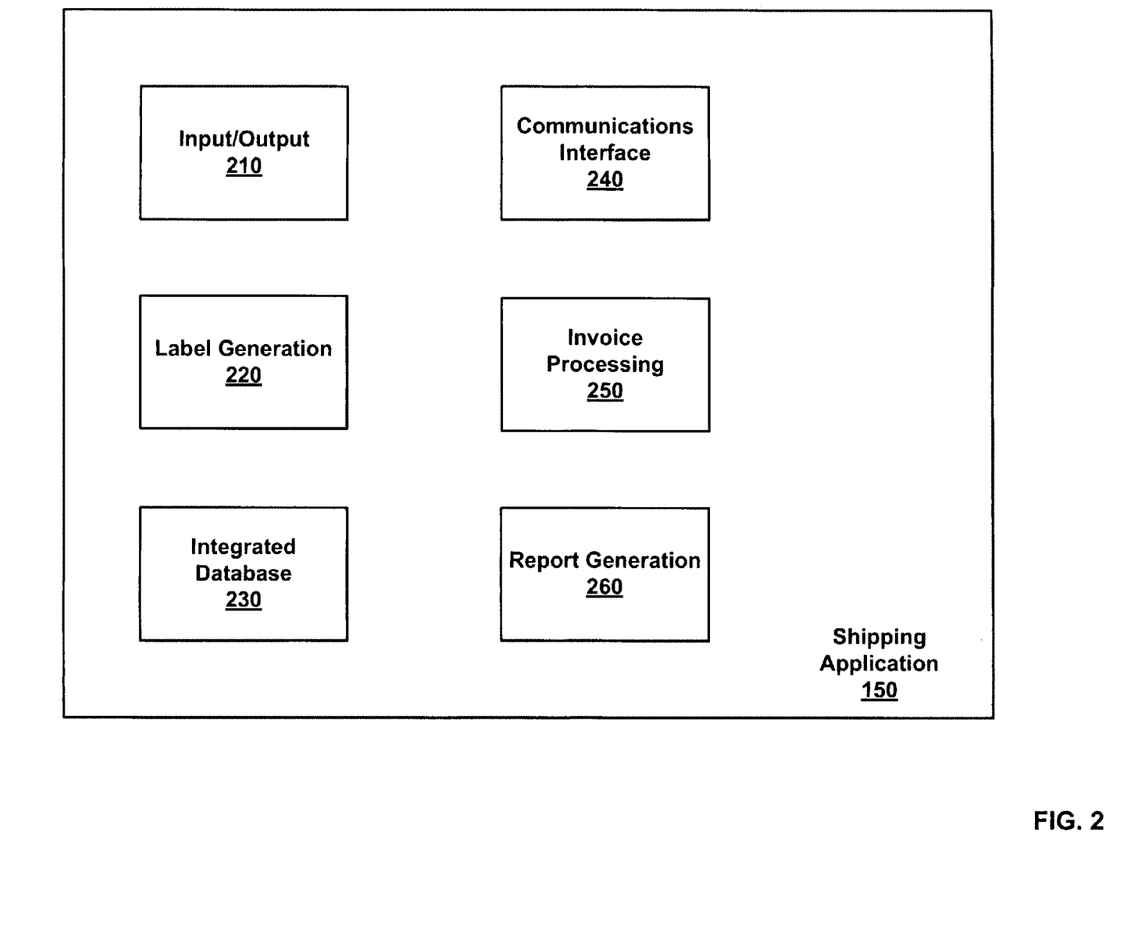
FIG. 2 is a block diagram of an exemplary shipping application for use with an integrated database for shipping information.

FIG. 2 is a block diagram of an exemplary shipping application for use with an integrated database for shipping information. As illustrated, shipping application 150 includes input/output 210, label generation module 220, integrated database 230, communications interface 240, invoice processing module 250, and report generation module 260.

Input/output 210 is configured to allow for communication between shipping application 150 and various other elements of user network 120. Input/output 210 may be configured to communicate using a network port, a wireless connector, an Ethernet or TCP/IP standard, etc. Information communicated through input/output 210 may include, for example, various shipping specifications for shipping labels, invoice information from various shipping vendors, etc.

Label generation module 220 generates labels for shipment. Information in the labels may be provided by a user, a contacts manager or contacts database on a user device, shipping vendors 160A-C, etc. For example, a user may enter recipient information using user device 130A, or the user may designate a contact and a contact address listed in a contacts database (e.g., Microsoft Outlook®, Lotus Notes®, etc.) as the recipient of a shipment. Label generation module 220 then generates shipping labels for the designated contact. Various types of label information may be gathered during label generation, including user information, recipient information, tracking numbers, billing information, client number, department codes, etc. In some embodiments label information may further include various shipping specifications, pricing information, etc.

Integrated database 230 is configured to store various types of shipping-related information. The information stored in integrated database 230 may include label information, invoice information, billing information, user information, etc. concerning multiple shipping vendors and/or various international office shipments. Storing the various types of shipping information from the multiple shipping vendors and international services in integrated database 230 allows for efficient retrieval and analysis of such information. For example, a user may use multiple shipping vendors in carrying out business for a particular account. Integrated database 230 allows the user to retrieve and analyze label and invoice information from multiple shipping vendors associated with the account without having to gather and review the different types of information from the multiple shipping vendors separately. Further, in some embodiments, information stored in integrated database 230 may be transmitted to an accounting system (e.g., accounting system 140 of user network 120) to be used in cost allocation, cost recovery, billing, etc. Alternatively, integrated database 230 may provide information for one or more feeds, exports, or reports (e.g., generated by report generator 250, described below) for the accounting system (e.g., accounting system 140).

Communications interface 240 allows for communication with various shipping vendors. In some cases, receiving invoice information from a particular vendor may involve using a particular interface specific to that vendor, and communications interface 240 may include various vendor-specific application programming interfaces (APIs). For example, receiving an invoice from FedEx® may involve using an API specific to FedEx®, receiving an invoice from UPS® may involve using an API specific to UPS®, and so forth. In some embodiments, communications interface 240 may be used to receive electronic data interchange (EDI) files associated with shipping invoices from a particular shipping vendor. EDI files are files that confirm to a set of standards for electronic transmission between businesses. Such EDI files may be received from a shipping vendor and stored in integrated database 230. In some embodiments, invoice information may be pulled directly from the label generation, including data entered during label generation.

Invoice processing module 250 is configured to receive and process invoice information from shipping invoices associated with multiple shipping vendors. In some embodiments, invoice processing module 250 receives EDI files from various shipping vendors and extracts various invoice information from the EDI files. Invoice processing module 250 may also provide the invoice information to integrated database 230 for storage.

Report generation module 260 provides one or more reports concerning shipping information, such as label information and invoice information. Reports may further be based on various report specifications. The shipping information is provided by integrated database 230, and report specifications may be provided by a user, a system administrator, etc. For example, a user may request a report concerning a particular account, a particular department, particular dates, etc. Some reports may be generated regularly, such as monthly accounting reports. Label information from FedEx® shipments, for example, may be compared and associated with shipping invoice information from FedEx® by report generation module 250, and the accounting staff alerted to any discrepancies so that the accounting staff may request credit from FedEx®. The same may be done for label and invoice information associated with UPS®, DHL®, etc. Further, a shipping invoice or shipping invoice entry concerning a particular shipment may be matched or associated with corresponding label information from that same shipment. Reports generated by report generation module 250 may also be used as input for accounting system 140 for cost allocation, cost recovery, billing, requests for credit from the shipping vendors, etc.

Figure 3:
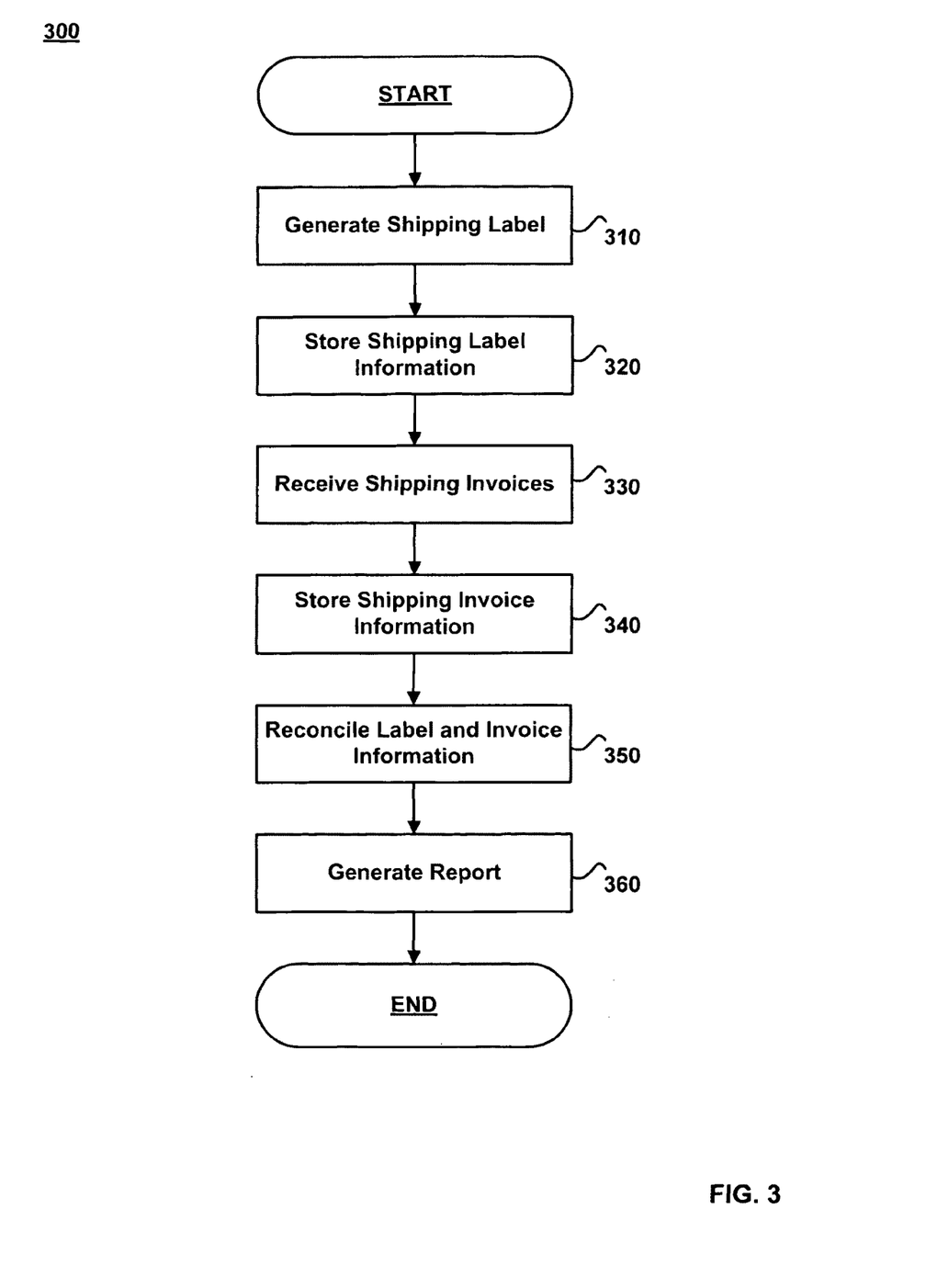
FIG. 3 is a flowchart depicting an exemplary method for creating and using an integrated database for shipping information.

FIG. 3 is a flowchart depicting an exemplary method for creating and using an integrated database for shipping information. In this method, a shipping label is generated, label information is stored, shipping invoices are received, invoice information is stored, label information and invoice information are reconciled, and a report is generated.

In step 310, a shipping label is generated based on various shipping specifications. The shipping label may be generated by a label generator (e.g., label generation module 220) to be vendor-specific to one of various shipping vendors, such as FedEx®, UPS®, USPS®, DHL®, local couriers, intra-office shipments, etc.

In step 320, label information is stored in an integrated database (e.g., integrated database 230). A shipping label may include information concerning, for example, the sender, the recipient, the shipping vendor, the various shipping specifications, a tracking number, billing codes, department codes, etc. In some embodiments of the present invention, label information gathered during label generation may further include pricing information, delivery information, billing information, etc.

In step 330, shipping invoices are received. Some shipping vendors may send a user a shipping invoice concerning various shipments sent by the respective shipping vendor. A shipping invoice may include information concerning, for example, invoice numbers, shipping options, final pricing information, discounts and surcharges, etc. In some embodiments, the invoice information may be included in an electronic billing file (e.g., EDI file), which may be received electronically. Alternatively, some embodiments of the present invention may allow for entry of non-electronic invoices (e.g., paper invoices).

In step 340, the invoice information is stored in the integrated database (e.g., integrated database 230). As a result, the integrated database includes the invoice information, in addition to the label information, concerning multiple shipping vendors and intra-office shipments.

In optional step 350, label information and invoice information are reconciled. For example, information from an invoice from FedEx® may be compared to information on various shipping labels on shipments sent through FedEx®. The shipping labels may be matched with corresponding invoice entries on various invoices. In some embodiments, label information may be only a subset of the information appearing on a shipping invoice. Any discrepancies may be noted, and/or accounting staff may be alerted to any discrepancies.

In step 360, a report is generated based on the label information and invoice information or data derived from other shipping transactions (e.g., USPS® mail and intra-Office shipments). For example, a report may list discrepancies between label information and invoice information, where, for example, an invoice indicates a cost vastly different from the pricing information indicated in the label information. The report may further be based on various report specifications designated by a user, a system administrator, etc. For example, a user may wish to view all shipping information related to a particular department or user. A report may be generated to include only the shipping information related to the indicated department or indicated user.

Some reports may be used as input in accounting systems (e.g., accounting system 140). For example, some users may bill clients for shipments sent on the clients' behalf. A user may generate a report concerning shipments associated with a particular client, and the report may be used as input in calculating a bill for that client.

Figure 4:
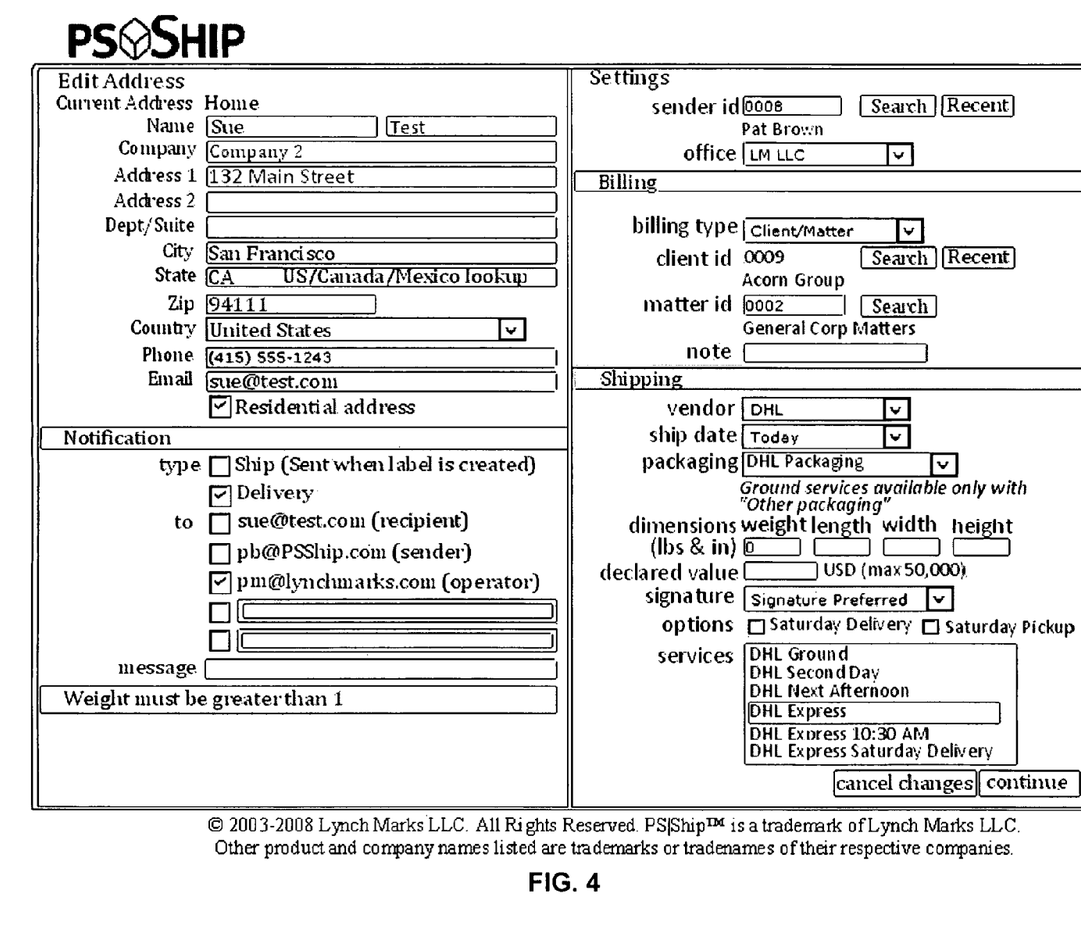
FIG. 4 is an exemplary screenshot of an application for label generation that may be used in an embodiment of the present invention.

FIG. 4 is an exemplary screenshot of an application for label generation that may be used in an embodiment of the present invention. The display indicates the various types of label information that may be gathered for label generation. The label information is stored in a database (e.g., integrated database 240), and some or all of the fields in the display may be automatically filled based on previously entered or designated shipping specifications. The display may further allow for the user to edit, add, or delete any of the shipping, billing, or delivery specifications before generating a shipping label.

Figure 5A:
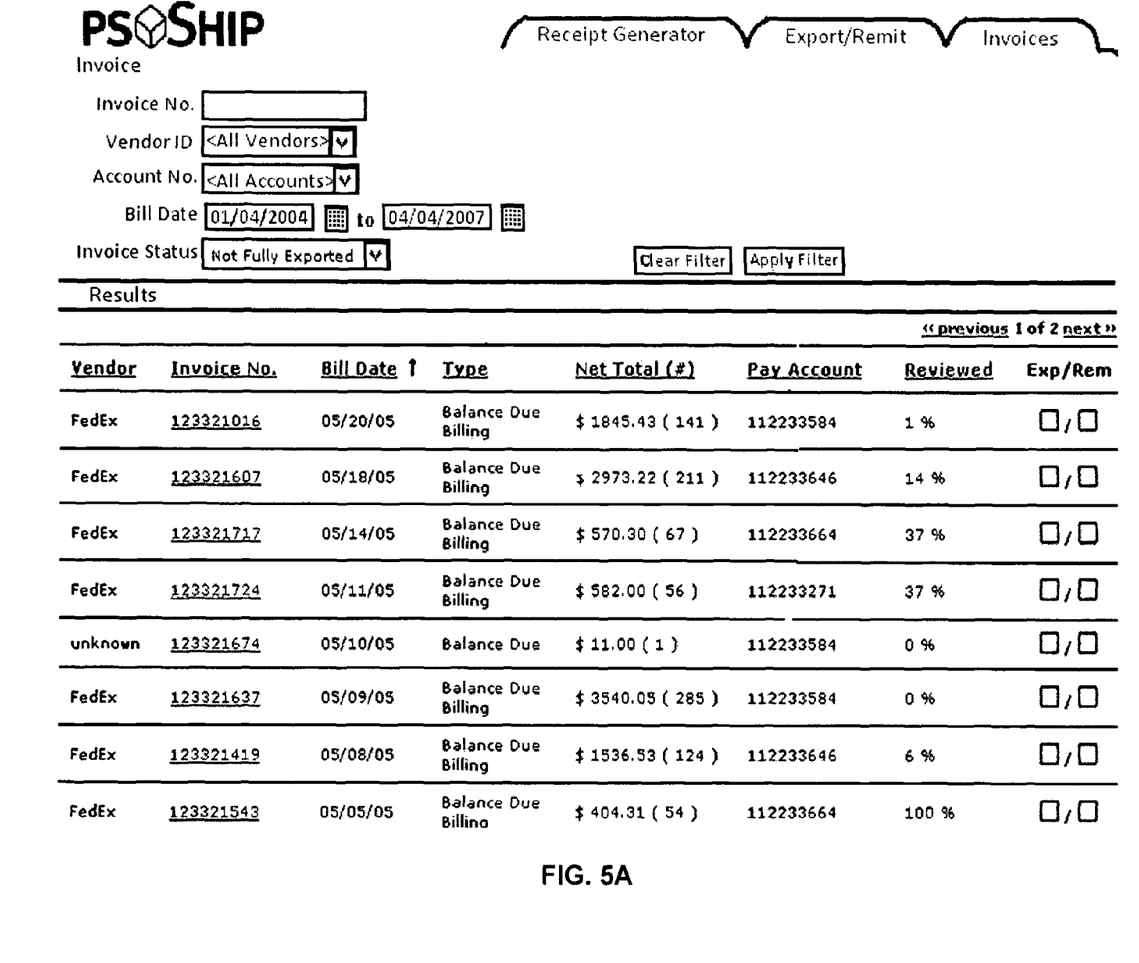
FIG. 5A is an exemplary screenshot of a report listing received shipping invoices in an embodiment of the present invention.

FIG. 5A is an exemplary screenshot of a report listing received shipping invoices in an embodiment of the present invention. The display includes information concerning invoices from FedEx® and DHL®. In some embodiments of the present invention, invoices may be reviewed before being exported and used as input for various purposes (i.e., accounting/billing).

Figure 5B:
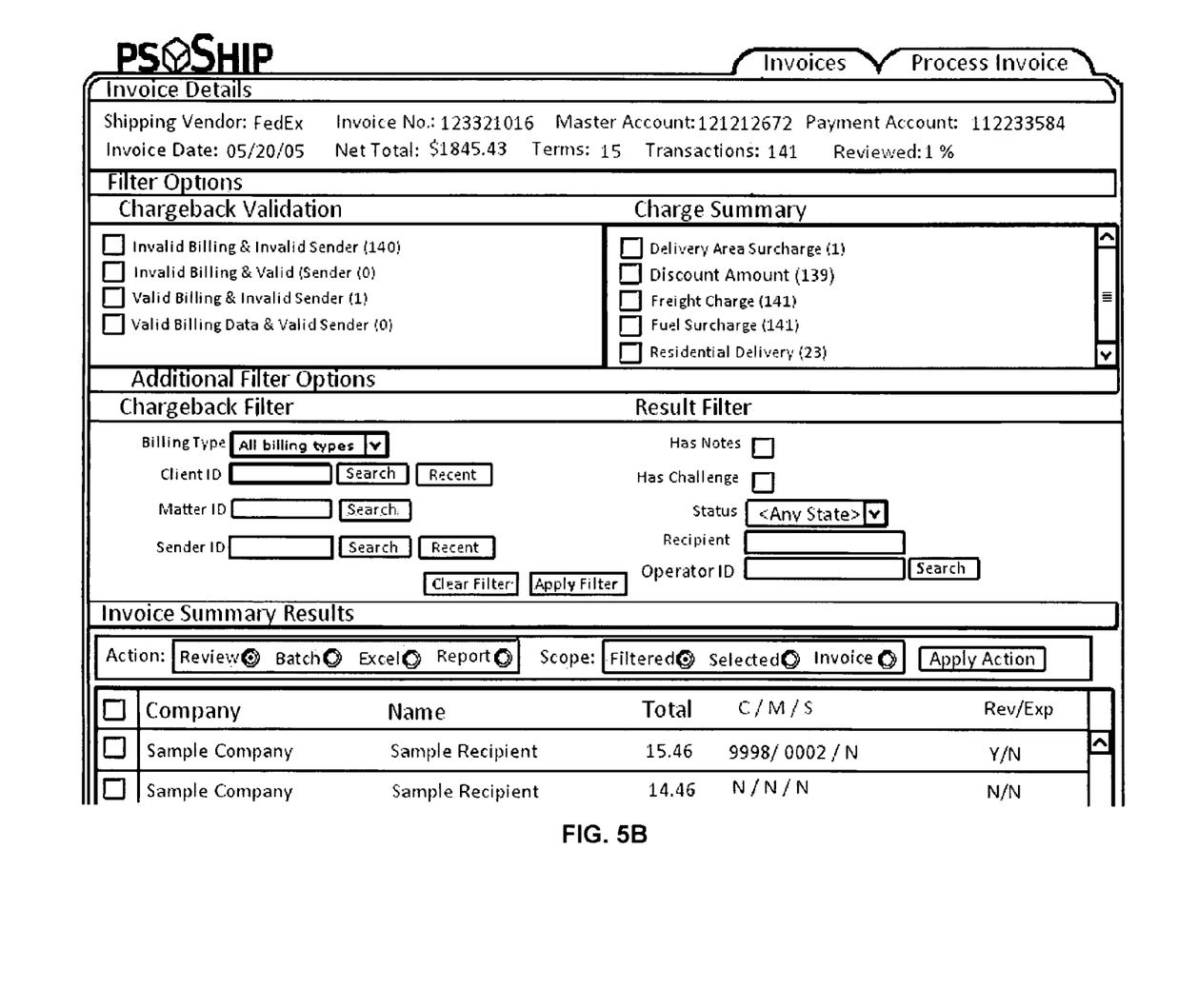
FIG. 5B is an exemplary screenshot of a shipping invoice in an embodiment of the present invention.

FIG. 5B is an exemplary screenshot of a shipping invoice in an embodiment of the present invention. The display includes detailed invoice information from the first invoice in the list illustrated in FIG. 5A. Such a display indicates the various types of information that may be included in a shipping invoice. In embodiments of the present invention, such information may be received electronically in an EDI file. Such information, along with various other types of shipping information stored in the integrated database, may be processed, analyzed, and presented in various types of reports.

Figure 5C:
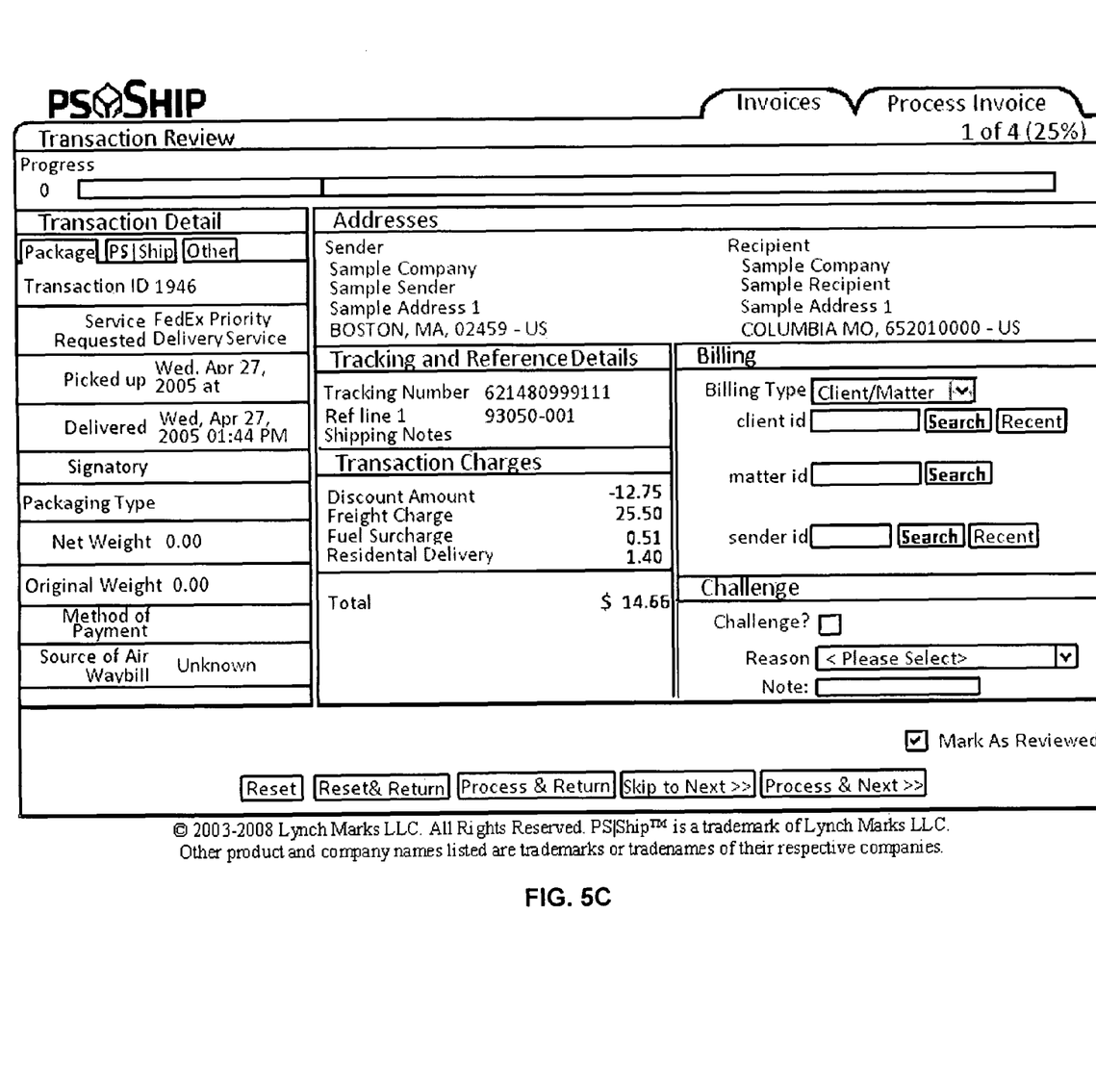
FIG. 5C is an exemplary screenshot of line-item detail of a shipping transaction in an embodiment of the present invention.

FIG. 5C is an exemplary screenshot of invoice line-item detail in an embodiment of the present invention. As illustrated, the display includes information concerning the transaction details, tracking details, billing details, etc. The display further includes an option for a user to designate billing information and/or to challenge the transaction.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for using an integrated database for tracking shipping information, the method comprising:
generating a plurality of shipping labels, each of the shipping labels being associated with one of a plurality of shipping vendors and non-invoiced shipments;
storing label information concerning the shipping labels in a database in memory;
receiving one or more shipping invoices from the plurality of shipping vendors over a communication network, the shipping invoices including cost data concerning the plurality of non-invoiced shipments; and
generating a report based on at least the stored label information and the received shipping invoices and cost data by matching the stored label information to corresponding entries in the received shipping invoices.

2. The method of claim 1, further comprising storing invoice information concerning the received shipping invoices and the received cost data in the database.

3. The method of claim 1, wherein the label information is designated by a user during label generation.

4. The method of claim 1, wherein receiving the shipping invoices further comprises receiving invoice information through vendor-specific communications interfaces.

5. The method of claim 1, wherein receiving the shipping invoices from the plurality of shipping vendors further comprises receiving electronic billing files associated with one or more of the plurality of shipping vendors.

6. The method of claim 1, further comprising assigning a tracking number to each of the shipping labels, wherein matching the shipping invoices with the label information is further based on tracking numbers.

7. The method of claim 1, wherein generating the report further comprises providing information concerning the shipping invoices, cost data, and the associated label information to an accounting system.

8. A method for using an integrated database for tracking shipping information, the method comprising:
receiving label information associated with one of a plurality of shipping vendors and plurality of non-invoiced shipments over a communication network;
storing the label information in a database in memory;
receiving one or more shipping invoices from the plurality of shipping vendors over the communication network, the shipping invoices including cost data concerning the plurality of non-invoiced shipments; and
generating a report based on at least the stored label information and the received shipping invoices and the received cost data by matching the stored label information to corresponding entries in the received shipping invoices.

9. A system for using an integrated database for tracking shipping information, the system comprising:
a label generator configured to generate a plurality of shipping labels associated with one of a plurality of shipping vendors and a plurality of non-invoiced shipments;
a database configured to store label information concerning each of the shipping labels generated by the label generator;
a report generator configured to generate a report based on at least the stored label information from the database and invoice information associated with one or more shipping invoices received from the plurality of shipping vendors or cost data associated with the plurality of non-invoiced shipments, the report being generated by matching the stored label information to corresponding entries in the received shipping invoices.

10. The system of claim 9, wherein the database is further configured to store the invoice information associated with one or more vendor-specific shipping invoices and cost data concerning the plurality of non-invoiced shipments.

11. The system of claim 9, further comprising a communications interface configured to receive the shipping invoices from the plurality of shipping vendors.

12. The system of claim 11, wherein the communications interface comprises vendor-specific interfaces associated with each of the plurality of shipping vendors.

13. The system of claim 11, wherein the communications interface is further configured to receive electronic billing files associated with each of the one or more shipping vendors.

14. The system of claim 11, wherein the communications interface is further configured to receive manually entered invoice information and to provide the manually entered invoice information to the report generator.

15. The system of claim 9, wherein the report generator is further configured to allocate each entry to a user account based on the associated label information.

16. The system of claim 9, wherein the report generator is further configured to provide information concerning the shipping invoices and the associated label information to an accounting system.

17. A non-transitory computer-readable storage medium having stored thereupon executable computing instructions for performing a method, the method comprising:

generating a plurality of shipping labels, each of the labels being associated with one of a plurality of shipping vendors and a plurality of non-invoiced shipments;

storing label information concerning the shipping labels in a database;

receiving one or more shipping invoices from the plurality of shipping vendors, the shipping invoices including cost data concerning the plurality of non-invoiced shipments; and generating a report based on at least the stored label information and the received shipping invoices and cost data by matching the stored label information to corresponding entries in the received shipping invoices.

18. The non-transitory computer-readable storage medium of claim 17, wherein the executable instructions further provide for providing information concerning the shipping invoices, cost data, and associated label information to an accounting system.

* * * * *